United States Patent [19]
Wenzel

[11] Patent Number: 5,150,972
[45] Date of Patent: Sep. 29, 1992

[54] METHOD OF INCREASING THE OFF BOTTOM LOAD CAPACITY OF A BEARING ASSEMBLY

[76] Inventor: William R. Wenzel, 3763 - 74 Avenue, Edmonton, Alberta, Canada, T6B 2T7

[21] Appl. No.: 766,016

[22] Filed: Sep. 26, 1991

[30] Foreign Application Priority Data

Oct. 1, 1990 [CA] Canada .................................. 2026630

[51] Int. Cl.⁵ .......................... E21B 4/00; F16C 19/30; B21D 53/10
[52] U.S. Cl. .................... 384/97; 29/898.06; 175/107; 384/618
[58] Field of Search .................. 384/92, 97, 609, 611, 384/61, 618–620; 29/898.06; 175/107, 371

[56] References Cited
U.S. PATENT DOCUMENTS

| | | | |
|---|---|---|---|
| 3,449,030 | 6/1969 | Tiraspolsky | 384/611 |
| 4,029,368 | 6/1977 | Tschirky et al. | 384/97 |
| 4,501,454 | 2/1985 | Dennis et al. | 384/619 |
| 4,511,193 | 4/1985 | Geczy | 384/611 |
| 4,729,675 | 3/1988 | Trzeciak et al. | 384/613 |

*Primary Examiner*—Thomas R. Hannon
*Attorney, Agent, or Firm*—Davis, Bujold & Streck

[57] ABSTRACT

A method of increasing the off bottom load capacity of a bearing assembly having an outer tubular member, an inner tubular member telescopically received within the outer tubular member, and bearings disposed between the inner tubular member and outer tubular member to facilitate relative rotation of the outer tubular member and inner tubular member while bearing radial and axial loads. The method consists of the following described steps. Firstly, form a first shoulder and a second shoulder in opposed spaced relation on an interior surface of the outer tubular member. Secondly, form a first shoulder and a second shoulder in opposed spaced relation on an exterior surface of the inner tubular member. The shoulders on the inner tubular member are generally parallel to the shoulders on the outer tubular member thereby defining a containment chamber. Thirdly, place at least one thrust bearing in the containment chamber. The thrust bearing having a first side race and a second side race. When the bearing assembly is placed in compression the first shoulder of the outer tubular member bears against the first side race and the second shoulder of the inner tubular member bears against the second side race. When the bearing assembly is placed in tension the second shoulder of the outer tubular member bears against the second side race and the first shoulder of the inner tubular member bears against the first side race.

3 Claims, 2 Drawing Sheets

METHOD OF INCREASING THE OFF BOTTOM LOAD CAPACITY OF A BEARING ASSEMBLY

The present invention relates to a method of increasing the off bottom load capacity of a bearing assembly.

BACKGROUND OF THE INVENTION

A downhole bearing assembly used in earth drilling consists of an outer tubular member, an inner tubular member telescopically received within the outer tubular member, and bearings disposed between the inner tubular member and the outer tubular member to facilitate relative rotation of the outer tubular member and the inner tubular member while accommodating radial and axial loads. Axial loading can be in either of two directions; commonly referred to as compression or tension. Compression loading is the greater of the two in an earth drilling application as the weight of the drill string is brought to bear on the bearing assembly. Tension loading is placed on the bearing assembly whenever the drill bit is lifted off the bottom of the bore hole.

It is the practise in the art to separate the function of the thrust bearings when designing bearing assemblies. One group of bearings take compression loads and a different group of bearings take tension loads. Of course, the load capacity of the bearings taking the compression loads must be much greater than the bearings taking the tension loads. The bearings taking the tension loads, commonly referred to as the "off bottom" bearings have become a weak link in the design of bearing assemblies. Generally, a single off bottom bearing is used. However, should the drill string temporarily become stuck in the bore hole the upwardly jarring force used to dislodge the drill string often exceeds the load capability of the off bottom bearing and damages the bearing assembly. An obvious solution to the problem would be to add sufficient additional off bottom bearings to increase the bearing assemblies off bottom load capacity. This solution is not viewed as practical as bearing assemblies are used for directional drilling, which requires the bearing assemblies to be as short as possible. Adding additional bearings would inevitably increase the length of the tool.

SUMMARY OF THE INVENTION

What is required is a method of increasing the off bottom load capacity of a bearing assembly without increasing the length of the tool.

According to one aspect of the invention there is provided a method of increasing the off bottom load capacity of a bearing assembly having an outer tubular member, an inner tubular member telescopically received within the outer tubular member, and bearings disposed between the inner tubular member and outer tubular member to facilitate relative rotation of the outer tubular member and inner tubular member while accommodating radial and axial loads. The method is comprised of the following described steps. Firstly, form a first shoulder and a second shoulder in opposed spaced relation on an interior surface of the outer tubular member. Secondly, form a first shoulder and a second shoulder in opposed spaced relation on an exterior surface of the inner tubular member. The shoulders on the inner tubular member are generally parallel to the shoulders on the outer tubular member thereby defining a containment chamber. Thirdly, place at least one thrust bearing in the containment chamber. The thrust bearing having a first side race and a second side race. When the bearing assembly is placed in compression the first shoulder of the outer tubular member bears against the first side race and the second shoulder of the inner tubular member bears against the second side race. When the bearing assembly is placed in tension the second shoulder of the outer tubular member bears against the second side race and the first shoulder of the inner tubular member bears against the first side race.

By following the described method the same bearings used to bear the compression load can be used to bear the tension load. This provides two significant advantages over the prior art. The first advantage is that fewer bearings are required, the need for one or more separate off bottom bearings is eliminated. The second advantage is that bearings with sufficient capacity to handle anticipated compression loading in a selected application will have a load capacity which far exceeds the load capacity of the off bottom bearings previously used. The Applicant has therefore, greatly increased the ability of the bearing assembly to withstand tension loading while actually reducing the number of bearings required.

According to another aspect of the invention there is provided an improvement in a bearing assembly having an outer tubular member, an inner tubular member telescopically received within the outer tubular member, and bearings disposed between the inner tubular member and outer tubular member to facilitate relative rotation of the outer tubular member and inner tubular member while accommodating radial and axial loads. The improvement is comprised of a first shoulder and a second shoulder in opposed spaced relation on the outer tubular member. A first shoulder and a second shoulder in opposed spaced relation on the inner tubular member. The shoulders on the inner tubular member are generally in parallel spaced relation to the shoulders on the outer tubular member thereby defining a containment chamber. At least one thrust bearing is disposed in the containment chamber. The thrust bearing has a first side race and a second side race. When the bearing assembly in placed in compression the first shoulder of the outer tubular member bears against the first side race and the second shoulder of the inner tubular member bears against the second side race. When the bearing assembly is placed in tension the second shoulder of the outer tubular member bears against the second side race and the first shoulder of the inner tubular member bears against the first side race.

Although beneficial results may be obtained through the use of the described improvement, the bearing will prematurely wear if it is run in a "neutral" position without sufficient load. Even more beneficial results may therefore be obtained by having biasing means disposed in the containment chamber whereby a preload is maintained on the thrust bearing.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
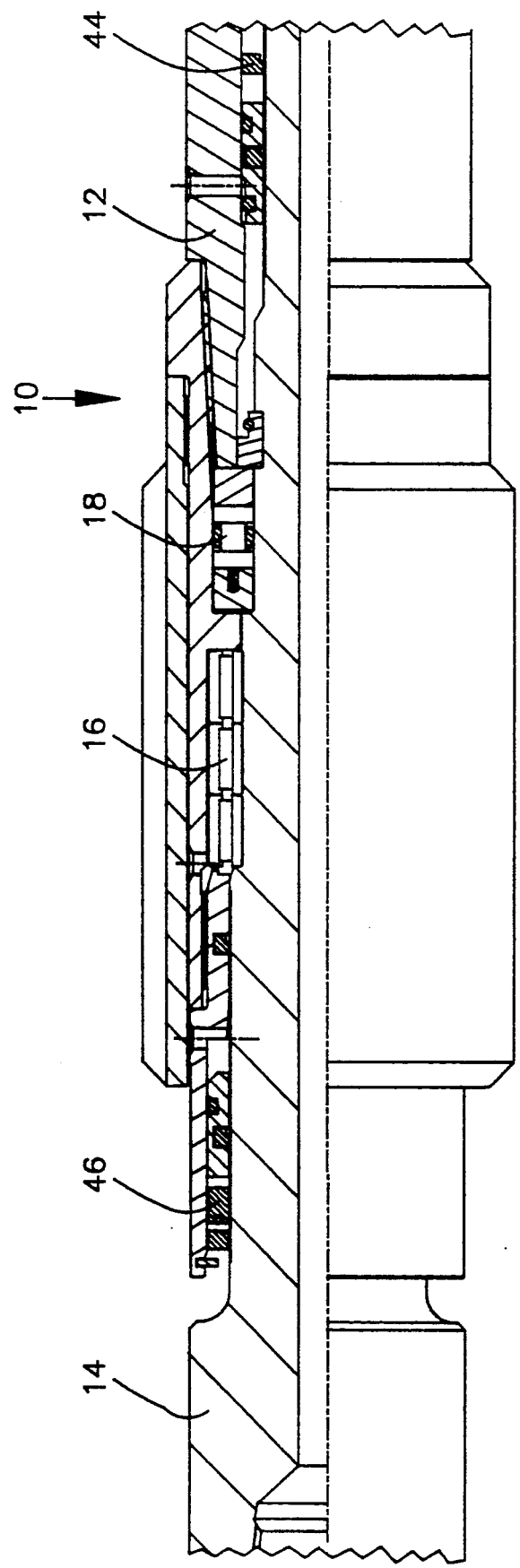
FIG. 1 is a longitudinal section view of a bearing assembly constructed in accordance with the teachings of the invention.

The preferred embodiment, a bearing assembly generally identified by reference numeral 10, will now be described with reference to FIG. 1 and 2. Bearing assembly 10 was constructed in accordance with the Applicants method of increasing the off bottom load capacity of a bearing assembly. For clarity, those portions of bearing assembly 10 which are known in the prior art will be described first, followed by a description of the improvements effected in accordance with the teaching of the Applicants method.

Figure 2:
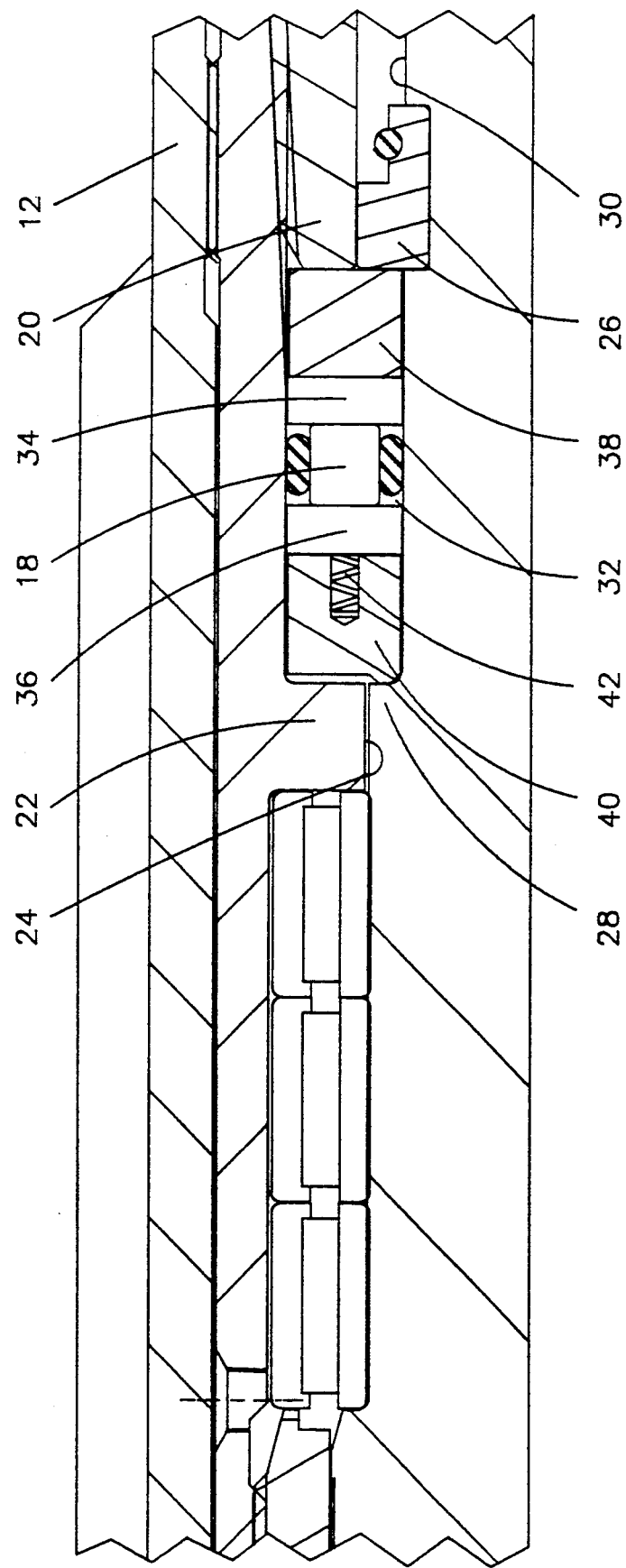
FIG. 2 is a longitudinal section view of a portion of the bearing assembly illustrated in FIG. 1.
Figure 1:
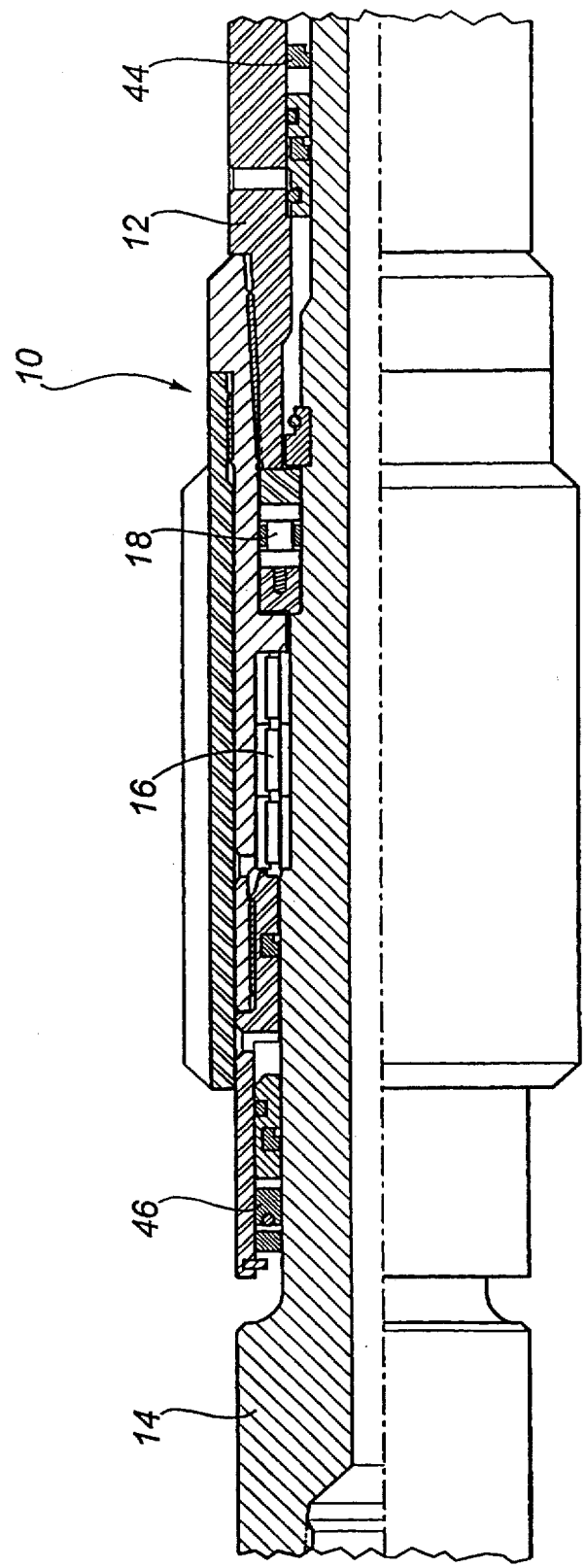
Figure 2:
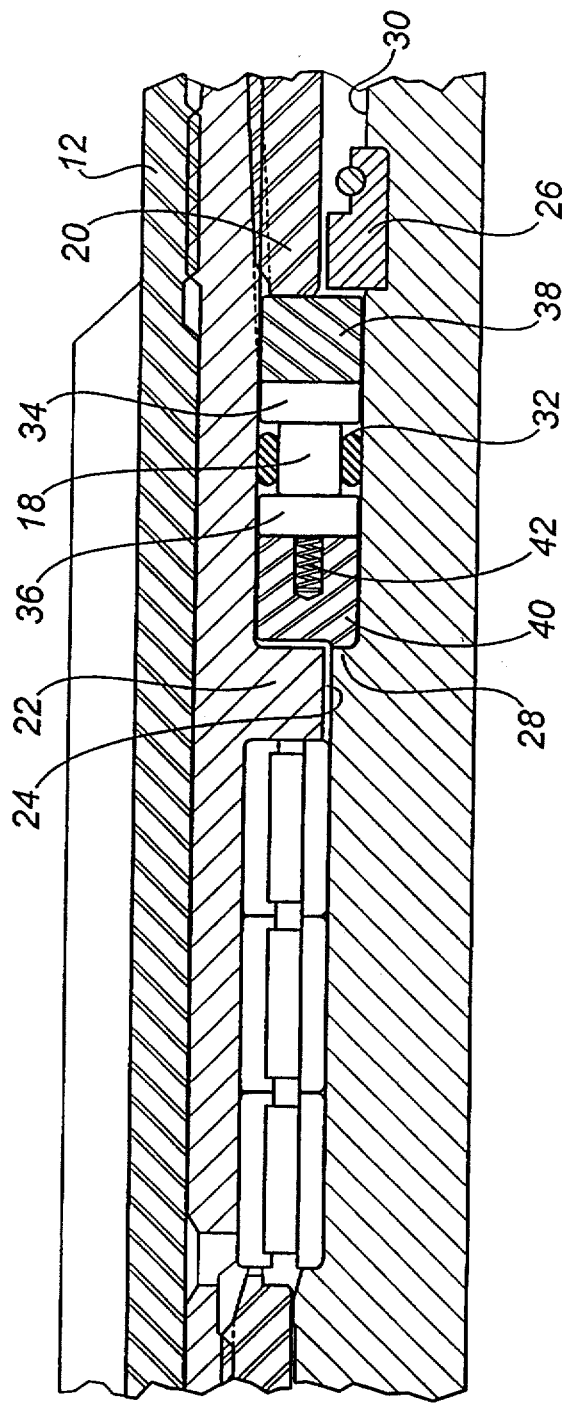

Referring to FIG. 1, bearing assembly 10 has an outer tubular member 12 and an inner tubular member 14. Inner tubular member 14 is telescopically received within outer tubular member 12. Bearings 16 and 18 are disposed between inner tubular member 14 and outer tubular member 12 to facilitate relative rotation of outer tubular member 12 and inner tubular member 14 while accommodating radial and axial loads. Bearings 16 are intended to take radial loads. Bearing 18 is intended to take axial loading; both in compression and in tension in accordance with the Applicant's method, a description of which follows.

The underlying principle behind the Applicant's method is that existing bearing assemblies have a greater capacity for compression loading than tension loading. If the same bearings which take compression loading could be made to also take tension loading it would increase the off bottom load capacity of the bearing assembly while eliminating the need for a separate off bottom bearing. The method consists of the following described steps, which are best understood with reference to FIG. 2. Firstly, form a first shoulder 20 and a second shoulder 22 in opposed spaced relation on the interior surface 24 of outer tubular member 12. Secondly, form a first shoulder 26 and a second shoulder 28 in opposed spaced relation on the exterior surface 30 of inner tubular member 14. First shoulder 20 on outer tubular member 12 and first shoulder 26 on inner tubular member 14 are generally parallel. Second shoulder 22 on outer tubular member 12 and second shoulder 28 on inner tubular member 14 are also generally parallel. Shoulders 20, 22, 26, and 28 define a containment chamber 32. Thirdly, place thrust bearing 18 in containment chamber 32. For the purpose of this description thrust bearing 18 will be considered to have a first side race 34 and a second side race 36. In FIG. 2 only one thrust bearing 18 is illustrated, however, it will be appreciated that sufficient number of thrust bearings 18 will be used to withstand the compression loading anticipated. It will also be appreciated that when multiple bearings are used means are required to distribute the load between the bearings. The Applicant prefers to maintain a preload on thrust bearing 18. Such a preload ensures that thrust bearing 18 does not deflect out of position in containment chamber 32 and that thrust bearing 18 does not operate in a neutral position which would cause premature wear. A variety of biasing means can be used to place a preload on thrust bearing 18. In bearing assembly 10 as illustrated in FIG. 2, the Applicant has placed spacers 38 and 40 on opposite sides of thrust bearing 18. Spacer 38 is against first side race 34. Spacer 40 is against second side race 36. Spacer 40 has a plurality of springs 42 which exert a biasing force on second side race 36 placing a preload on thrust bearing 18.

Illustrated in FIG. 1, but not forming part of the invention and not previously described are sealing means 44 and 46 which prevent the entry of abrasive drilling fluids into the bearings.

The use and operation of the improvement in bearing assembly 10 accordance with the teachings of the method will now be described with reference to FIG. 1 and 2. Referring to FIG. 2, when bearing assembly 10 is placed in compression, first shoulder 20 of outer tubular member 12 bears against first side race 34 and second shoulder 28 of inner tubular member 14 bears against second side race 36. When bearing assembly 10 is placed in tension second shoulder 22 of outer tubular member 12 bears against second side race 36 and first shoulder 26 of inner tubular member 14 bears against first side race 34. In this manner, thrust bearing 18 within containment chamber 32 bears axial loads both in compression and in tension.

It will be apparent to one skilled in the art that modifications may be made to the illustrated embodiment without departing from the spirit and scope of the invention as defined in the claims.

The embodiments of the invention in which an exclusive property or privilege is claimed are defined as follows:

1. A method of increasing the off bottom load capacity of a bearing assembly having an outer tubular member, an inner tubular member telescopically received within the outer tubular member, and bearings disposed between the inner tubular member and outer tubular member to facilitate relative rotation of the outer tubular member and inner tubular member while accommodating radial and axial loads, comprising the steps of:
   a) firstly, forming a first shoulder and a second shoulder in opposed spaced relation on an interior surface of the outer tubular member;
   b) secondly, forming a first shoulder and a second shoulder in opposed spaced relation on an exterior surface of the inner tubular member, the shoulders on the inner tubular member being generally aligned with the shoulders on the outer tubular member thereby defining a containment chamber; and
   c) thirdly, placing at least one thrust bearing in the containment chamber, the thrust bearing having a first side race and a second side race, such that when the bearing assembly is placed in compression the first shoulder of the outer tubular member bears against the first side race and the second shoulder of the inner tubular member bears against the second side race, and when the bearing assembly is placed in tension the second shoulder of the outer tubular member bears against the second side race and the first shoulder of the inner tubular member bears against the first side race.

2. An improvement in a bearing assembly having an outer tubular member, an inner tubular member telescopically received within the outer tubular member, and bearings disposed between the inner tubular member and outer tubular member to facilitate relative rotation of the outer tubular member and inner tubular member while bearing radial and axial loads, the improvement comprising:
   a) a first shoulder and a second shoulder in opposed spaced relation on an interior surface of the outer tubular member;
   b) a first shoulder and a second shoulder in opposed spaced relation on an exterior surface of the inner tubular member, the shoulders on the inner tubular member being generally parallel to the shoulders on the outer tubular member thereby defining a containment chamber; and c) at least one thrust bearing disposed in the containment chamber, the thrust bearing having a first side race and a second side race, such that when the bearing assembly in placed in compression the first shoulder of the outer tubular member bears against the first side race and the second shoulder of the inner tubular member bears against the second side race, and when the bearing assembly is placed in tension the second shoulder of the outer tubular member bears against the second side race and the first shoulder of the inner tubular member bears against the first side race.

3. The improvement as defined in claim 2, having biasing means disposed in the containment chamber whereby a preload is maintained on the thrust bearing.

* * * * *

UNITED STATES PATENT AND TRADEMARK OFFICE
CERTIFICATE OF CORRECTION

PATENT NO. : 5,150,972

DATED : September 29, 1992

INVENTOR(S) : William R. WENZEL

It is certified that error appears in the above-identified patent and that said Letters Patent is hereby corrected as shown below:

The title page should be deleted to appear as per attached.

In the Drawings:
Figures 1 and 2 should be deleted to appear as per attached sheets.

Signed and Sealed this

Fifteenth Day of February, 2000

Attest:

Q. TODD DICKINSON

Attesting Officer

Commissioner of Patents and Trademarks

United States Patent [19]

Wenzel

[11] Patent Number: 5,150,972

[45] Date of Patent: Sep. 29, 1992

[54] METHOD OF INCREASING THE OFF BOTTOM LOAD CAPACITY OF A BEARING ASSEMBLY

[76] Inventor: William R. Wenzel, 3763 - 74 Avenue, Edmonton, Alberta, Canada, T6B 2T7

[21] Appl. No.: 766,016

[22] Filed: Sep. 26, 1991

[30] Foreign Application Priority Data

Oct. 1, 1990 [CA] Canada ................ 2026630

[51] Int. Cl.⁵ ............ E21B 4/00; F16C 19/30; B21D 53/10
[52] U.S. Cl. ............ 384/97; 29/898.06; 175/107; 384/618
[58] Field of Search ........ 384/92, 97, 609, 611, 384/61, 618–620; 29/898.06; 175/107, 371

[56] References Cited

U.S. PATENT DOCUMENTS

| | | | |
|---|---|---|---|
| 3,449,030 | 6/1969 | Tiraspolsky | 384/611 |
| 4,029,368 | 6/1977 | Tschirky et al. | 384/97 |
| 4,501,454 | 2/1985 | Dennis et al. | 384/619 |
| 4,511,193 | 4/1985 | Geczy | 384/611 |
| 4,729,675 | 3/1988 | Trzeciak et al. | 384/613 |

*Primary Examiner*—Thomas R. Hannon
*Attorney, Agent, or Firm*—Davis, Bujold & Streck

[57] ABSTRACT

A method of increasing the off bottom load capacity of a bearing assembly having an outer tubular member, an inner tubular member telescopically received within the outer tubular member, and bearings disposed between the inner tubular member and outer tubular member to facilitate relative rotation of the outer tubular member and inner tubular member while bearing radial and axial loads. The method consists of the following described steps. Firstly, form a first shoulder and a second shoulder in opposed spaced relation on an interior surface of the outer tubular member. Secondly, form a first shoulder and a second shoulder in opposed spaced relation on an exterior surface of the inner tubular member. The shoulders on the inner tubular member are generally parallel to the shoulders on the outer tubular member thereby defining a containment chamber. Thirdly, place at least one thrust bearing in the containment chamber. The thrust bearing having a first side race and a second side race. When the bearing assembly is placed in compression the first shoulder of the outer tubular member bears against the first side race and the second shoulder of the inner tubular member bears against the second side race. When the bearing assembly is placed in tension the second shoulder of the outer tubular member bears against the second side race and the first shoulder of the inner tubular member bears against the first side race.

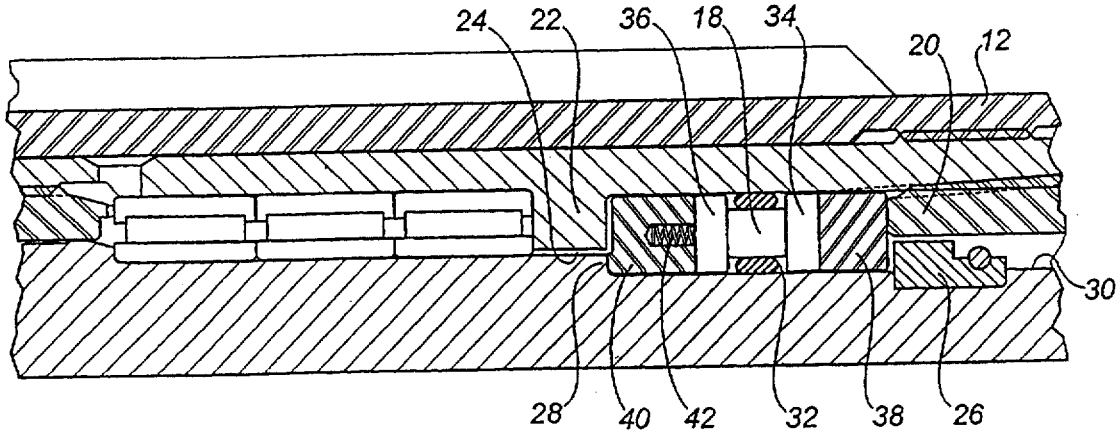

3 Claims, 2 Drawing Sheets